Figure 3:
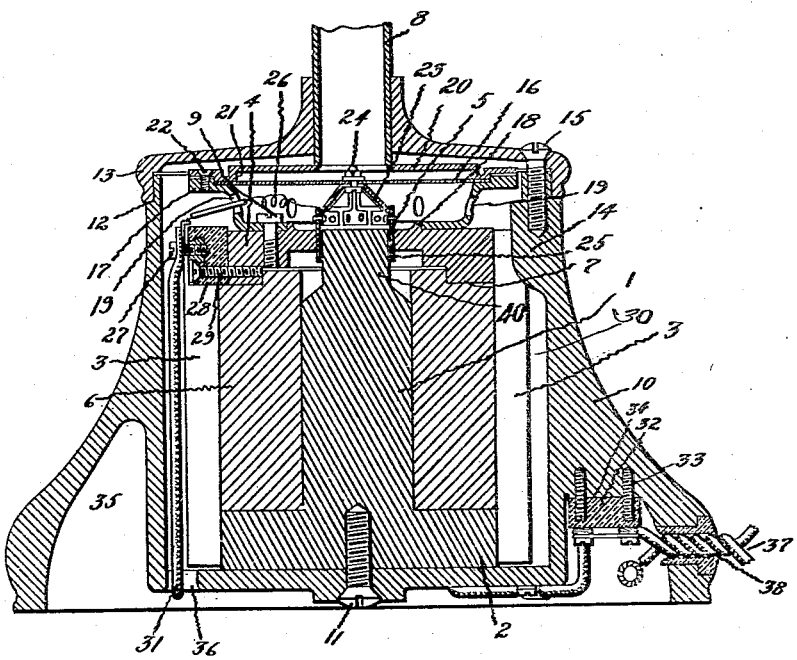

Aug. 4, 1925.
A. P. YOUNG
1,548,697
ELECTRICAL APPARATUS
Filed May 19, 1923
3 Sheets-Sheet 1
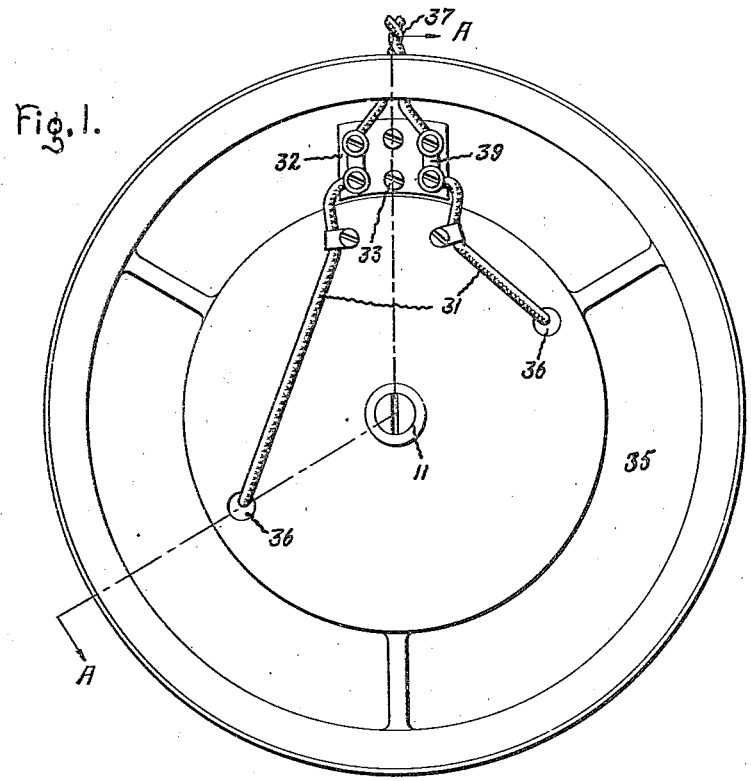
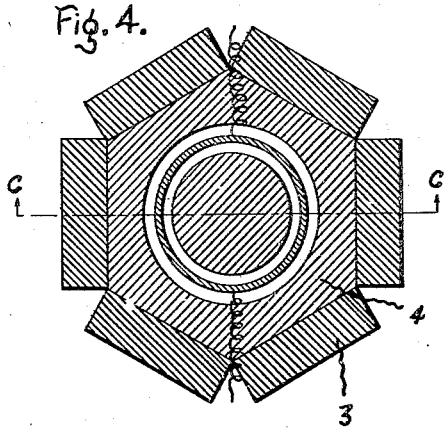
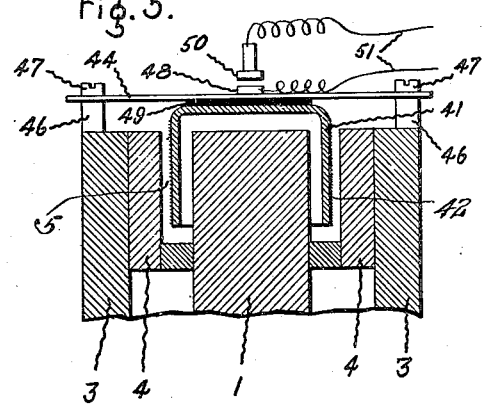
Inventor:
Arthur P. Young;
by
His Attorney.

Aug. 4, 1925.
A. P. YOUNG
1,548,697
ELECTRICAL APPARATUS
Filed May 19, 1923  3 Sheets-Sheet 2
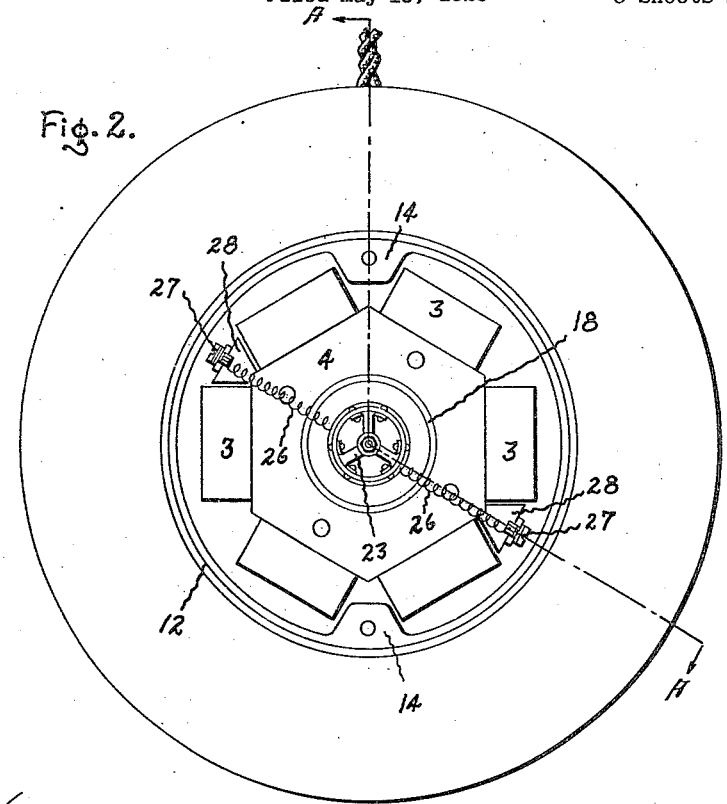
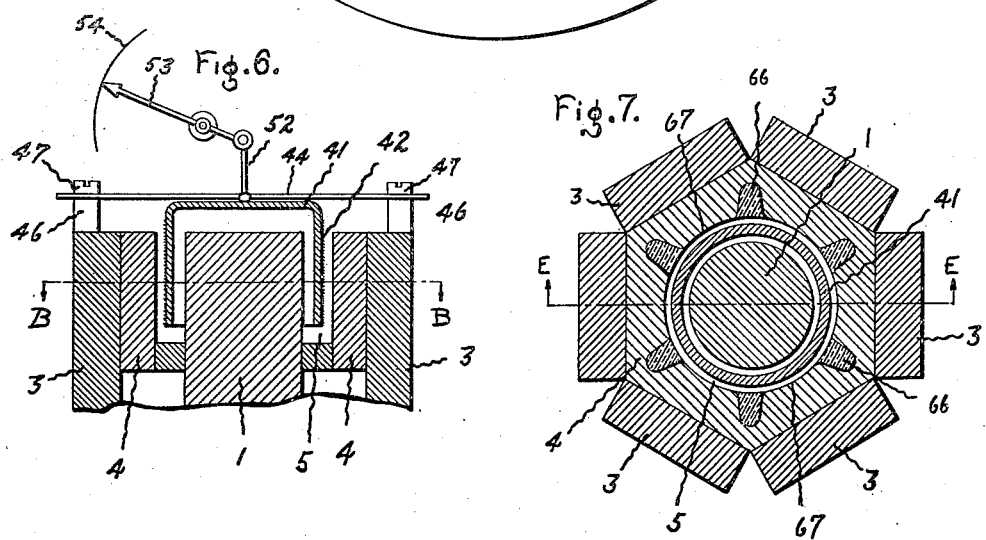
Inventor:
Arthur P. Young;
by *Alexander S. [signature]*
His Attorney.

Aug. 4, 1925.

A. P. YOUNG

ELECTRICAL APPARATUS

Filed May 19, 1923

1,548,697

3 Sheets-Sheet 3

Inventor:
Arthur P. Young:
by
His Attorney.

Patented Aug. 4, 1925.

1,548,697

UNITED STATES PATENT OFFICE.

ARTHUR P. YOUNG, OF KENILWORTH, ENGLAND, ASSIGNOR TO GENERAL ELECTRIC COMPANY, A CORPORATION OF NEW YORK.

ELECTRICAL APPARATUS.

Application filed May 19, 1923. Serial No. 640,059.

*To all whom it may concern:*

Be it known that I, ARTHUR PRIMROSE YOUNG, a subject of the King of England, residing at Dovedale, Kenilworth, Coventry, in the county of Warwick, England, have invented certain new and useful Improvements in Electrical Apparatus, of which the following is a specification.

My present invention relates to sound producing devices, such as telephone receivers and loud speaking telephones, of the type in which the movement of a circular electric coil in an annular air gap of a magnetic field is communicated to a diaphragm which sets up sound waves in response to the fluctuations of current in the coil. Also to that type of instrument used as a submarine or air sound receiver in which the sound waves are received by the diaphragm, the vibrations of which vibrate a coil disposed in the air gap of a magnetic field producing thereby oscillating currents in the coil. It is applicable to apparatus such as electric motors and also to that type of motor which may be adapted for use as an integrating meter for measuring energy units, ampere hours, or the like; or it may be applied to an instrument arranged to indicate current or power, or to operate a relay or the like upon the current in its circuit reaching a predetermined value; i. e. it may be applied to all instruments employing a permanent magnetic circuit, the flux of which is arranged to influence an armature either to rotate it or to actuate it in some other manner.

More particularly my invention relates to an improved construction of magnetic circuit for apparatus of this character and to certain features of construction and design whereby a compact and inexpensive instrument can be manufactured.

In carrying out my invention I construct electrical apparatus of the character aforementioned with a magnetic circuit comprising a central core having at one end a flange or outwardly projecting limbs against the periphery of which are located the like poles of an annular magnet or of a number of short bar magnets.

The other ends of the magnet or magnets are adjacent an annular pole piece or a number of inwardly directed pole pieces arranged to cooperate with a pole piece, or a free end, of the central core, between which and the annular pole pieces remains an annular shaped gap.

In the preferred construction, a synthetic resin such as bakelite is moulded round a portion of the central core in a fluid condition, the magnets and pole pieces being suitably spaced, and, upon hardening, the bakelite serves to retain the members in position. In like manner the bakelite may be cast externally of the structure, in order that a separate casing may be dispensed with.

Figure 8:
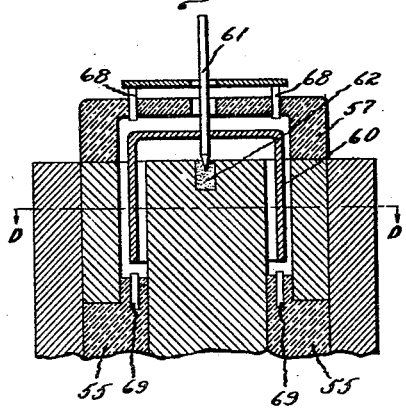
Figure 9:
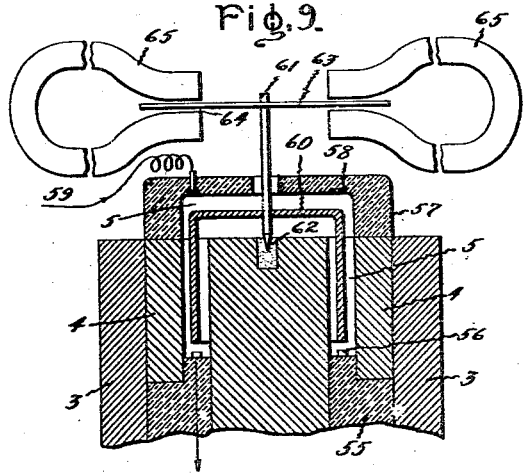

The novel features which I believe to be characteristic of my invention are set forth with particularity in the appended claims. My invention itself, however, will best be understood by reference to the following description taken in connection with the accompanying drawings in which Fig. 1 is a bottom plan view of a loud speaker telephone embodying my invention; Fig. 2 is a top view thereof; the diaphragm and supporting members and cover plate being removed for the sake of clearness; Fig. 3 is a sectional elevation along the line A—A of Figs. 1 and 2; Figs. 4, 5 and 6 represent the application of my invention to current indicators, Fig. 4 being a sectional plan view along the line B—B of Fig. 6; and Figs. 5 and 6 being sectional elevations along the line C—C of Fig. 4 showing two different types of indicators; Figs. 7, 8 and 9 show another modification of my invention, Fig. 9 being a sectional elevation of a mercury motor, Fig. 7 a sectional plan along the line D—D of Fig. 8; and Fig. 8 representing a compact type of mercury motor adapted for use as an integrating meter, and being a sectional elevation along the line E—E of Fig. 7.

Similar reference numerals are used to denote like parts throughout. In the different figures of the drawing I have shown six short bar magnets 3 made preferably from cobalt steel, as supplying the magnetizing force, and consequently the peripheries of the flange and annular pole piece or pole pieces are made hexagonal. 1 represents the central core of the magnetic circuit at the bottom of which is a flange 2 and secured to the periphery of the flange by cement or the like, are the bar magnets 3 parallel to and of substantially the same length as the central core. The other ends of these bar magnets are held against the annular pole piece 4 between which and the upper end of the central core 1 there remains the annular shaped gap 5.

In the arrangement shown in Figs. 1, 2 and 3, the central portion of the central core 1 is surrounded by an annular block 6 of non-magnetic material such as aluminum or insulating material to which the magnets 3 may be secured by screws or any suitable means. The upper end of this block 6 is provided with a circular channel which engages with a corresponding circular projection 7 upon the annular shaped pole piece 4. A suitably shaped casing 10 encloses the magnetic structure, being held to the central core by any suitable means, as, for example, by a screw 11, and the upper rim of this casing is provided with a groove 12 upon which fits a corresponding channel in the cover plate 13. The shoulders 14 are provided on the upper rim of the casing and the cover plate 13 is held in position by screws 15 engaging into these shoulders. The cover plate 13 is provided with a central aperture through which passes the neck of the sound horn 8 (not fully shown).

The rim of the diaphragm 16 is gripped between two supporting members, one of which 17 is secured to the annular pole piece 4 by the screws 9 and abuts against a circular rim 18 formed integrally upon this pole piece. The supporting ring 17 is provided with poles 19 for a purpose that will be hereinafter more fully explained. Clamped to this supporting ring is the upper ring 20 having an annular projection 21 which bears against the upper rim of the diaphragm, the rings being secured together by screws 22. A central hole is provided in the ring 20 corresponding to the neck 8 of the sound horn.

A light spider 23, made of aluminum or any suitable material, is rigidly secured to the diaphragm by a bolt or rivet 24, which may be firmly soldered in position. This spider carries a thin cylindrical casing 25 riveted thereto and depending into the gap 5, and oscillating current is supplied to a coil carried by this casing 25 through the leads 26 which pass through the holes 19 in the diaphragm supporting ring 17 and are connected to terminals 27 carried upon bushings 28, these latter being secured to the periphery of the pole piece 4 by screws 29. Along the space 30, between the magnetic structure and the outer casing 10, pass the leads 31 to the bushing 32 of insulating material, which is secured by screws 33 to a shoulder 34 formed in the groove 35 running around the lower end of the casing, holes 36 being provided for the passage of these connections 31. Current is brought in through leads 37 passing through the hole 38 in the casing and connected to the terminals 39, to which are also connected the leads 31.

The diaphragm may be made of best ruby mica or any suitable material, but preferably is made from phosphor bronze about 4 mils thick and having annular corrugations stamped or spun around its center. I have also used with success a diaphragm made of linen or fabric impregnated with a synthetic resin such as bakelite.

The magnetic structure, it will be seen, consists of the bar magnets 3, the flange 2 of the central core, the central core itself, the narrowed upper end 40 of the central core and the annular pole piece 4.

In a modification of this invention instead of employing the annular block 6, this space may be filled with a synthetic resin such as bakelite which is moulded therein and which, upon setting, serves firmly to retain the magnetic members in position. In like manner a synthetic resin such as bakelite may be molded around the outside of the magnetic structure in the space 30, and this permits of the separate casing 10 being dispensed with. The surface of the core, the magnets, or the pole piece may be roughened, or holes or slots may be provided therein, in order that the bakelite may more intimately engage therewith.

The method of supporting the diaphragm by means of a ring 17 which leaves a large air space beneath the diaphragm tends to avoid the damping effect which is noticeable with a diaphragm working in too small an air space, and the holes 19 communicating with the larger space 30 serve to augment this feature. When fluctuating currents of audible frequencies are passed through the actuating coil, corresponding movement of the same in the gap 5 takes place and the diaphragm 16 is vibrated accordingly. This construction gives a powerful magnetic field in the air gap, and since the movement of the coil for a given current is proportional to the field strength the construction is very suitable for a loud speaking instrument.

In Figs. 4, 5 and 6 I have shown the same general construction of magnetic circuit applied to instruments for indicating current or the like. A light spider or cup-shaped member 41 having a coil 42 wound therearound is secured to a spring member 44 and arranged to float in the gap 5. This spring member is preferably supported on the pillars 46 by means of screws 47 loosely fitting through short longitudinal slots in the spring member 44.

In Fig. 5 a contact 48 is carried by the spring member 44 and an insulating washer 49 is arranged between the spring member 44 and the cup 41. Current is brought into the coil 42 through the leads shown in Fig. 4 and will cause movement of the coil longitudinally of the gap 5. A contact 50 of an indicating circuit 51 is arranged to cooperate with the contact 48 so that upon current through the coil 42 reaching a certain predetermined value electrical connection will be established between these contacts. The indicating circuit 51 will contain a cell and any suitable indicating means such as a lamp or a bell; or it may be connected up so as to operate a switch or to act as a relay or to control a resistance connected in the circuit of a motor or of a generator.

In a modification, instead of the contact 48, a rubber pad of the type that is used in face massage, may be suitably connected to the cup 41; such an instrument will serve as a vibrator when connected to a source of alternating or intermittent current.

In Fig. 6 the instrument is arranged as an indicating instrument or sensitive ammeter. A rod 52 is pivoted at one end to a pointer 53 cooperating with a suitable scale 54, the rod being firmly secured at its other end to the spring member and cup 41. With a suitable scale this type of instrument will read direct current whichever way the terminals of the coil 42 are connected. For according to one set of connections the coil will be drawn further into the gap 5 and according to the other it will be repelled therefrom.

In Fig. 9 I have shown a mercury motor having a similar type of magnetic circuit to that previously described. The lower portion of the gap 5 is here filled with moulded insulating material 55 embedded in which is a conducting ring 56. Enclosing the upper end of the gap 5 is a cover plate 57 of moulded insulating material upon the interior of which is embedded the conducting ring 58, and the enclosed chamber 5 is filled with mercury. Current is preferably brought in along the lead 59 to the upper ring 58 leaving through the lower ring 56. These rings may be made of copper and are situated respectively above and below the depending portion of a light amalgamated copper cup 60. This cup is rigidly secured to the shaft 61, the lower end of which may be journalled in a footstep or sapphire jewel bearing 62 located centrally in the central core 1. A motor constructed upon these principles is able to take a large current for a relatively small applied E. M. F.

When this type of motor is used as an integrating meter a light copper disc 63 may be secured to the shaft 61 so that it rotates in the air gaps 64 of permanent horseshoe magnets 65, these magnets providing the necessary braking effect in order that the rotation of the cup may be proportional to the current or power supplied, and by suitably gearing a worm on the spindle 61 to a train of wheels in a manner that is well known, the instrument may be made to register ampere hours or the like.

In Figs. 7 and 8 I have shown a form of eddy current braking in which the external disc 63 and magnets 65 are dispensed with. In this construction longitudinal grooves 66 are provided in the annular pole piece 5 and filled in with a non-magnetic material such as bakelite so that the inner surface of the pole piece is still cylindrical. This divides the pole piece into a number of separate pole faces 67, and I have shown one pole face corresponding to each bar magnet. In this case the current is brought into the instrument through a set of spaced terminals 68 arranged substantially above the depending portion of the cup 60 and between two of the longitudinal channels 66. Cooperating spaced terminals 69 are embedded in the insulating material 55 and serve to carry away the current. Both the upper and lower sets of terminals may be connected together respectively outside the instrument. According to this construction current is supplied to the mercury chamber at points where the magnetic flux is strongest, i. e., at places corresponding to the pole faces 67, and this permits eddy currents to circulate in the places where the magnetic flux is weaker opposite the channels 66.

The electrical apparatus having this construction of magnetic circuit is both compact and simple to manufacture and assemble, and at the same time it has a powerful exciting force which it is found does not appreciably alter or deteriorate with the passing of time even when subjected to hard and continuous service.

What I claim as new and desire to secure by Letters Patent of the United States, is:

1. The combination in an apparatus of the class described of a magnetic circuit comprising a central core having at one end thereof a flange and a plurality of permanent bar magnets having their like poles secured to the outer periphery of said flange.

2. The combination in an apparatus of the class described of a magnetic circuit comprising a central core having at one end thereof a flange, a plurality of permanent bar magnets having their like poles secured to the outer periphery of said flange, and their opposite poles secured to a pole piece which in conjunction with the opposite end of the central core forms therewith an annular air gap.

3. The combination in an apparatus of the class described of a magnetic circuit comprising a central core having at one end thereof a flange and a plurality of permanent bar magnets having their like poles secured to the periphery of said flange, said magnets being secured to a member of non-magnetic material surrounding the central core.

4. The combination in an apparatus of the class described of a magnetic circuit comprising a central core having at one end thereof a flange and a plurality of permanent bar magnets having their like poles adjacent the periphery of said flange, said magnets being secured to a body of moulded insulating material surrounding said central core.

5. The combination in an apparatus of the class described of a magnetic circuit comprising a central core having at one end thereof a flange, a plurality of permanent bar magnets having their like poles adjacent the periphery of said flange, and their opposite poles adjacent a pole piece which in conjunction with the opposite end of the central core forms therewith an annular air gap, said magnets being secured to a member of non-magnetic material surrounding the central core.

6. The combination in an apparatus of the class described of a magnetic circuit comprising a central core having at one end thereof a flange, a plurality of permanent bar magnets having their like poles adjacent the periphery of said flange, and their opposite poles adjacent a pole piece which in conjunction with the opposite end of the central core forms therewith an annular air gap, said magnets being secured to a body of moulded insulating material surrounding said central core.

7. The combination in an apparatus of the class described of a magnetic circuit comprising a central core and an annular pole piece surrounding said core and forming in conjunction therewith an annular air gap, a casing surrounding said magnetic structure, an annular coil mounted in said air gap, a diaphragm to which said coil is attached and a supporting ring for said diaphragm which is secured to said pole piece, said ring being provided with openings which provide communication with the space between the diaphragm and the pole piece and other air space within the casing.

In witness whereof, I have hereunto set my hand this 17th day of May 1923.

ARTHUR P. YOUNG.